US008548064B2

(12) United States Patent
Kitahara et al.

(10) Patent No.: US 8,548,064 B2
(45) Date of Patent: Oct. 1, 2013

(54) VIDEO ENCODING METHOD AND DECODING METHOD BY USING SELECTED PARALLAX FOR PARALLAX COMPENSATION, APPARATUSES THEREFOR, PROGRAMS THEREFOR, AND STORAGE MEDIA FOR STORING THE PROGRAMS

(75) Inventors: Masaki Kitahara, Yokosuka (JP); Hideaki Kimata, Tokyo (JP); Shinya Shimizu, Yokosuka (JP); Kazuto Kamikura, Yokosuka (JP); Yoshiyuki Yashima, Yokosuka (JP); Masayuki Tanimoto, Nagoya (JP); Toshiaki Fujii, Tokyo (JP); Kenji Yamamoto, Tokyo (JP)

(73) Assignees: Nippon Telegraph and Telephone Corporation, Tokyo (JP); National University Corporation Nagoya University, Nagoya (JP)

( * ) Notice: Subject to any disclaimer, the term of this patent is extended or adjusted under 35 U.S.C. 154(b) by 1184 days.

(21) Appl. No.: 12/087,040

(22) PCT Filed: Dec. 29, 2006

(86) PCT No.: PCT/JP2006/326297
§ 371 (c)(1),
(2), (4) Date: Jun. 24, 2008

(87) PCT Pub. No.: WO2007/077942
PCT Pub. Date: Jul. 12, 2007

(65) Prior Publication Data
US 2009/0028248 A1 Jan. 29, 2009

(30) Foreign Application Priority Data
Jan. 5, 2006 (JP) .................................. 2006-00394

(51) Int. Cl.
*H04N 7/12* (2006.01)

(52) U.S. Cl.
USPC ..................................................... 375/240.26

(58) Field of Classification Search
USPC ........................................ 375/240.01, 240.26
IPC ......................................................... H04N 7/12
See application file for complete search history.

(56) References Cited

U.S. PATENT DOCUMENTS 5,625,408 A * 4/1997 Matsugu et al. ................ 348/42
6,266,158 B1 7/2001 Hata et al.
(Continued)

FOREIGN PATENT DOCUMENTS

EP 1 414 245 A1 4/2004
EP 1414245 A1 4/2004
(Continued)

OTHER PUBLICATIONS

Strintzis, M. G., et al., "Object-Based Coding of Stereoscopic and 3D Image Sequences," IEEE Signal Processing Magazine, vol. 16, No. 3, May 1999, pp. 14-28.

(Continued)

*Primary Examiner* — Jay Au Patel
*Assistant Examiner* — Yulin Sun
(74) *Attorney, Agent, or Firm* — Harness, Dickey & Pierce, P.L.C.

(57) ABSTRACT

A video encoding method for encoding video images as a single video image by using parallax compensation which performs prediction by using parallax between the video images, and a corresponding decoding method. The number of parameters as parallax data used for the parallax compensation is selected and set for each reference image. Data of the set number of parameters is encoded, and parallax data in accordance with the number of parameters is encoded. During decoding, parallax-parameter number data, which is included in encoded data and designates the number of parameters as parallax data for each reference image, is decoded, and parallax data in accordance with the number of parameters is decoded, where the parallax data is included in the encoded data.

8 Claims, 14 Drawing Sheets

(56) References Cited

U.S. PATENT DOCUMENTS

| | | |
|---|---|---|
| 6,430,224 B1 | 8/2002 | Naito et al. |
| 6,519,358 B1 | 2/2003 | Yokoyama et al. |
| 2002/0061131 A1* | 5/2002 | Sawhney et al. ............ 382/154 |
| 2004/0141615 A1 | 7/2004 | Chujoh et al. |
| 2005/0163216 A1 | 7/2005 | Boon et al. |
| 2006/0078197 A1* | 4/2006 | Mitsumoto et al. .......... 382/154 |

FOREIGN PATENT DOCUMENTS

| | | |
|---|---|---|
| JP | 9-261653 A | 10/1997 |
| JP | 10-271511 A | 10/1998 |
| JP | 11-239351 A | 8/1999 |
| JP | 2003-009179 | 1/2003 |
| JP | 2004-7377 A | 1/2004 |
| KR | 10-2005-122717 | 12/2005 |
| KR | 10-2006-0108952 A | 10/2006 |
| RU | 2030119 C1 | 2/1995 |
| SU | 1665545 A1 | 7/1991 |

OTHER PUBLICATIONS

Hata, Koichi, et al., "Epipolar Geometry Estimation and Its Application to Image Coding," Proceedings, 1999 International Conference on Image Processing (ICIP 99), Kobe, Japan, Oct. 24-28, 1999, IEEE, pp. 472-476.

Wang, Ru-Shang, et al., "Multiview Video Sequence Analysis, Compression, and Virtual Viewpoint Synthesis," IEEE Transactions on Circuits and Systems for Video Technology, vol. 10, No. 3, Apr. 2000, pp. 397-410.

Koichi Hata, [[Satoshi Sakato]], Minoru Etoh, Kunihiro Chihara, 'Tashiten Gazo no Ko Noritsu Fugoka', "Coding of Multi-Viewpoint Images" The Transactions of the Institute of Electronics, Information and Communication Engineers, 1999 nen, November, vol. J82-D-II, No. 11, pp. 1921 to 1929.

Hideaki Kimata and Masaki Kitahara, "Preliminary results on multiple view video coding (3DAV)", document M10976 MPEG Redmond Meeting, Jul. 2004.

Masayuki Tanimoto, Toshiaki Fujii, "Response to Call for Evidence on Multi-View Video Coding", document Mxxxxx MPEG Hong Kong Meeting, Jan. 2005.

Shinya Oka, Purim Na Bangchang, Toshiaki Fujii, and Masayuki Tanimoto, "Ray-Space Coding for FTV", IPSJ SIG Technical Report, Dec. 19, 2003, vol. 2003 No. 125 p. 97-102, 2003-AVM-43.

* cited by examiner

VIDEO ENCODING METHOD AND DECODING METHOD BY USING SELECTED PARALLAX FOR PARALLAX COMPENSATION, APPARATUSES THEREFOR, PROGRAMS THEREFOR, AND STORAGE MEDIA FOR STORING THE PROGRAMS

CROSS-REFERENCE TO RELATED APPLICATIONS

This application is a 371 U.S. National Stage of International Application No. PCT/JP2006/326297, filed Dec. 29, 2006. This application claims the benefit of Japanese Patent Application No. JP 2006-000394, filed Jan. 5, 2006, which application is herein expressly incorporated by reference.

TECHNICAL FIELD

The present invention relates to encoding and decoding techniques of multi-viewpoint video images.

Priority is claimed on Japanese Patent Application No. 2006-000394, filed Jan. 5, 2006, the contents of which are incorporated herein by reference.

BACKGROUND ART

Multi-viewpoint video images are video images obtained by photographing the same subject and background thereof by using a plurality of cameras at different positions. Below, a video image obtained by a single camera is called a "two-dimensional video image", and a set of two-dimensional video images obtained by photographing the same subject and background thereof is called a "multi-viewpoint video image". There is a strong correlation between two-dimensional video images (of the different cameras) included in the multi-viewpoint video image. If the cameras are synchronized with each other, the frames (of the cameras) corresponding to the same time have captured the subject and background thereof in entirely the same state, so that there is a strong correlation between the cameras.

First, conventional techniques relating to the encoding of two-dimensional video images will be shown. In many known methods of encoding two-dimensional video images, such as H. 264, MPEG-4, MPEG-2 (which are international encoding standards), and the like, highly-efficient encoding is performed by means of motion compensation, orthogonal transformation, quantization, entropy encoding, or the like. For example, in H.264, each I frame can be encoded by means of intraframe correlation; each P frame can be encoded by means of interframe correlation together with a plurality of past frames; and each B frame can be encoded by means of interframe correlation together with a plurality of past or future frames.

Even though Non-Patent Document 1 discloses the H.264 techniques in detail, the outline thereof will be described below. In each I frame, the frame is divided into blocks (called "macroblocks", the size of each block is 16×16 (pixels)), and intraframe prediction (intra-prediction) is performed in each macroblock. In intra-prediction, each macroblock is further divided into smaller blocks (called "sub-blocks", below), and an individual intra-encoding method can be applied to each sub-block.

In each P frame, intra-prediction or inter-prediction (inter-frame prediction) may be performed in each macroblock. The intra-prediction applied to a P frame is similar to that applied to an I frame. In the inter-prediction, motion compensation is performed. Also in the motion compensation, each macroblock is divided into smaller blocks, and each sub-block may have an individual motion vector and an individual reference image.

Also in each B frame, intra-prediction or inter-prediction can be performed. In the inter-prediction of the B frame, in addition to a past frame, a future frame can be referred to as a reference image in motion compensation. For example, when encoding a frame sequence of "I→B→B→P", the frames can be encoded in the order of "I→P→B→B". Also in each B frame, motion compensation can be performed by referring to an I or P frame. Additionally, similar to the P frame, each sub-block (obtained by dividing a macroblock) can have an individual motion vector.

When performing intra or inter-prediction, a prediction residual is obtained. In each macroblock, a prediction-residual block is subjected to DCT (discrete cosine transform), so as to perform quantization. The obtained quantized values of DCT coefficients are then subjected to variable-length encoding. In each P frame or B frame, the reference image can be selected for each sub-block, and is indicated by a numerical value called a "reference image index", and is subjected to variable-length encoding. In H.264, the smaller the reference image index, the shorter the code used in the variable-length encoding. Therefore, in H.264, the reference image index is explicitly varied for each frame. Accordingly, the higher the frequency of use of a reference image, the smaller the reference image index assigned to the reference image, thereby efficiently encoding the reference image index.

In a known method for encoding multi-viewpoint video images, the multi-viewpoint video images are highly efficiently encoded by means of "parallax compensation" in which motion compensation is applied to images obtained by different cameras at the same time. Here, "parallax" is the difference between positions, to which the same point on a subject is projected, on an image plane of cameras which are disposed at different positions.

FIG. 13 is a schematic view showing the concept of parallax generated between such cameras. In the schematic view, an image plane of cameras, whose optical axes are parallel to each other, is looked down vertically. Generally, such points, to which the same point on a subject is projected, on an image plane of different cameras, are called "corresponding points". In parallax compensation, the corresponding point on an image of a reference camera, which corresponds to a target pixel in an image of a target camera for the relevant encoding, is estimated using a reference image, and the pixel value of the target pixel is predicted by using a pixel value assigned to the corresponding point. Below, such "estimated parallax" is also called "parallax" for convenience of explanation, and in such a method, parallax data and each prediction residual are encoded.

In many methods, parallax is represented by a vector (i.e., parallax (or disparity) vector) in an image plane. For example, in the method disclosed by Non-Patent Document 2, parallax compensation is performed for each block as a unit, where such parallax for each unit block is represented using a two-dimensional vector, that is, by using two parameters (i.e., x component and y component). FIG. 14 is a schematic view showing a parallax vector. That is, in this method, parallax data formed by two parameters and the relevant prediction residual are encoded. As this method does not use camera parameters in encoding, it is effective when camera parameters are unknown.

On the other hand, Non-Patent Document 3 discloses a method of encoding multi-viewpoint images (i.e., static images). In the method, camera parameters are used for encoding, and each parallax vector is represented by one-dimensional data based on the Epipolar geometry constraint, thereby efficiently encoding multi-viewpoint images.

FIG. 15 is a schematic view showing the concept of the Epipolar geometry constraint. In accordance with the Epipolar geometry constraint, in two images obtained by two cameras (i.e., "camera 1" and "camera 2"), point m' (assigned to point M on a subject) in one of the images, which corresponds to point m in the other image, is constrained on a straight line called an "Epipolar line". In the method of Non-Patent Document 3, parallax with respect to each reference image is represented using one parameter, that is, the position on a one-dimensional Epipolar line. That is, in this method, parallax data, which is represented by a single parameter, and the relevant prediction residual are encoded.

Even though there are two or more reference images (obtained by different cameras), parallax for each reference image can be represented using a single parameter by means of the Epipolar geometry constraint. For example, when the parallax on the Epipolar line for a reference image is known, then parallax for a reference image obtained by another camera can be reconstituted.

In addition, when there are a plurality of reference images obtained by different cameras, parallax compensation may be performed using an arbitrary viewpoint image technique. Non-Patent Document 4 discloses parallax compensation using an arbitrary viewpoint image technique. More specifically, each pixel value of an image obtained by a target camera for the relevant encoding is predicted by means of interpolation using the pixel values of corresponding points (belonging to different cameras) which correspond to the relevant pixel. FIG. 16 is a schematic view showing such interpolation. In the interpolation, the value of pixel m in a target image to be encoded is predicted by performing interpolation between pixels m' and m" of reference images 1 and 2, where the pixels m' and m" correspond to the pixel m.

Non-Patent Document 1: ITU-T Rec.H.264/ISO/IEC 11496-10, "Advanced Video Coding", Final Committee Draft, Document JVT-E022, September 2002.

Non-Patent Document 2: Hideaki Kimata and Masaki Kitahara, "Preliminary results on multiple view video coding (3DAV)", document M10976 MPEG Redmond Meeting, July, 2004.

Non-Patent Document 3: Koichi Hata, Minoru Etoh, and Kunihiro Chihara, "Coding of Multi-Viewpoint Images" IEICE transactions, Vol. J82-D-II, No. 11, pp. 1921-1929 (1999)

Non-Patent Document 4: Masayuki Tanimoto, Toshiaki Fujii, "Response to Call for Evidence on Multi-View Video Coding", document Mxxxxx MPEG Hong Kong Meeting, January, 2005.

In conventional methods of encoding multi-viewpoint video images, when the camera parameters are known, parallax data of each reference image can be represented by a single parameter regardless of the number of reference images, by means of the Epipolar geometry constraint, thereby efficiently encoding the parallax data.

However, when a multi-viewpoint video image obtained by actual cameras is a target image to be encoded, and parallax compensation is performed by constraining parallax on an Epipolar line, then prediction efficiency may be degraded due to an error in measured camera parameters. In addition, as each reference image includes a distortion due to encoding, the prediction efficiency may also be degraded when performing parallax compensation by constraining parallax on an Epipolar line. Such degradation in the prediction efficiency causes an increase in the amount of code of the relevant prediction residual, so that the total encoding efficiency is degraded.

DISCLOSURE OF INVENTION

In order to solve the above problem in the encoding of multi-viewpoint video images, an object of the present invention is to control the degree of freedom in parallax compensation in accordance with the characteristic of each reference image, and to improve the parallax-compensation accuracy even when there is an encoding distortion in a reference image or an error in measured camera parameters, so as to obtain a higher encoding efficiency in comparison with the conventional techniques.

The most distinctive feature of the present invention in comparison with the conventional techniques is that the number of parameters as parallax data is variable so as to control the degree of freedom in parallax compensation in accordance with the characteristic of each reference image, and that parallax-parameter number data or index data, which indicates the number of parameters, is encoded to be included in encoded data.

In addition to the number of parameters as parallax data, data for indicating each reference image used for parallax compensation can also be included in index data, and another data may also be included therein.

More specifically, in a first mode of the video encoding and decoding methods of the present invention, a process of encoding or decoding the number of parallax parameters is performed, where the number of parallax parameters designates the number of parameters as parallax data used for parallax compensation, in accordance with the characteristic of video image data.

Data of the number of parallax parameters may designate the dimension of a parallax vector for each reference image. When there are two reference images (A and B), the following value assignment is possible:

(i) pNum=0: both reference images A and B have a one-dimensional parallax vector (ii) pNum=1: reference image A has a one-dimensional parallax vector, and reference image B has a two-dimensional parallax vector (iii) pNum=2: reference image A has a two-dimensional parallax vector, and reference image B has a one-dimensional parallax vector (iv) pNum=3: both reference images A and B have a two-dimensional parallax vector The above index data pNum can be defined as the parallax-parameter number data.

First, on the video encoding side, the number of parameters so as to represent parallax data is set in a parallax-parameter number setting step. Then, parallax-parameter number data with respect to the number of parameters set in the parallax-parameter number setting step is encoded in a parallax-parameter number data encoding step. In addition, parallax data, which is represented using the number of parameters set in the parallax-parameter number setting step, is encoded in a parallax data encoding step.

On the other side, on the video decoding side, the parallax-parameter number data is first decoded in a parallax-parameter number data decoding step. Then, parallax data of the number of parameters, which is designated by the decoded parallax-parameter number data, is decoded in a parallax data decoding step.

In a second mode of the video encoding and decoding methods of the present invention, reference images which can be used for parallax compensation are assigned to each reference image index value. For example, when two reference images are used for generating a predicted image of parallax compensation, and three reference images (A, B, and C), which can be used, are stored in a reference image memory, then the following value assignment is possible:
(i) refIdx=0: reference images A and B
(ii) refIdx=1: reference images B and C
(iii) refIdx=2: reference images A and C Here, refIdx is the reference image index. In addition to above, a reference image index (value) corresponding to each decoded image of a target camera for the relevant encoding may be defined.

On the video encoding side, in addition to the process performed in the above first mode, a reference image setting step of determining a reference image used in parallax compensation, and a reference image index encoding step of encoding the reference image index are executed. On the video decoding side, a step of decoding the reference image index is executed.

When such a method is combined with the above-described conventional method of varying the reference image index number in H.264, each index value can be set in accordance with the characteristic of the relevant video image in a manner such that a small value is assigned to a reference image by which a high-quality predicted image can be generated, thereby improving the encoding efficiency.

In a third mode of the video encoding and decoding methods of the present invention, parallax-parameter number data, which can be used, is assigned to each reference image index (value). For example, when two reference images are used for generating a predicted image of parallax compensation, three reference images (A, B, and C), which can be used, are stored in a reference image memory, and the parallax-parameter number data pNum has two values (i.e., pNum=0 or 1), then the following value assignment is possible:
(i) refIdx=0: reference images A and B, pNum=0
(ii) refIdx=1: reference images A and B, pNum=1
(iii) refIdx=2: reference images B and C, pNum=0
(iv) refIdx=3: reference images B and C, pNum=1
(v) refIdx=4: reference images A and C, pNum=0
(vi) refIdx=5: reference images A and C, pNum=1

In this case, on the video encoding side, a reference image index encoding step of encoding the reference image index is executed, where the parallax-parameter number data is encoded in this step. On the video decoding side, a reference image index decoding step of decoding the reference image index is executed, where the parallax-parameter number data is decoded in this step.

When such a method is combined with the above-described conventional method of varying the reference image index number in H.264, the length of a variable-length code assigned to the parallax-parameter number data can be varied in accordance with the characteristic of the relevant video image, thereby efficiently encoding the parallax-parameter number data.

In parallax compensation used for encoding multi-viewpoint video images, (i) if the prediction efficiency is degraded when the prediction is performed in accordance with the Epipolar geometry constraint, due to a measurement error in camera parameters or an encoding distortion in each reference image, then the number of parameters for parallax data is increased so as to perform a prediction having a high degree of freedom, and (ii) if the prediction efficiency is sufficient even when the prediction is performed in accordance with the Epipolar geometry constraint, then a prediction which represents parallax by using one parameter is performed. Such a selection can be adaptively controlled in accordance with the characteristic of each frame or block (as a unit) in the relevant decoded image. Therefore, a higher encoding efficiency can be obtained in comparison with the conventional techniques.

BEST MODE FOR CARRYING OUT THE INVENTION

First Embodiment

Figure 1:
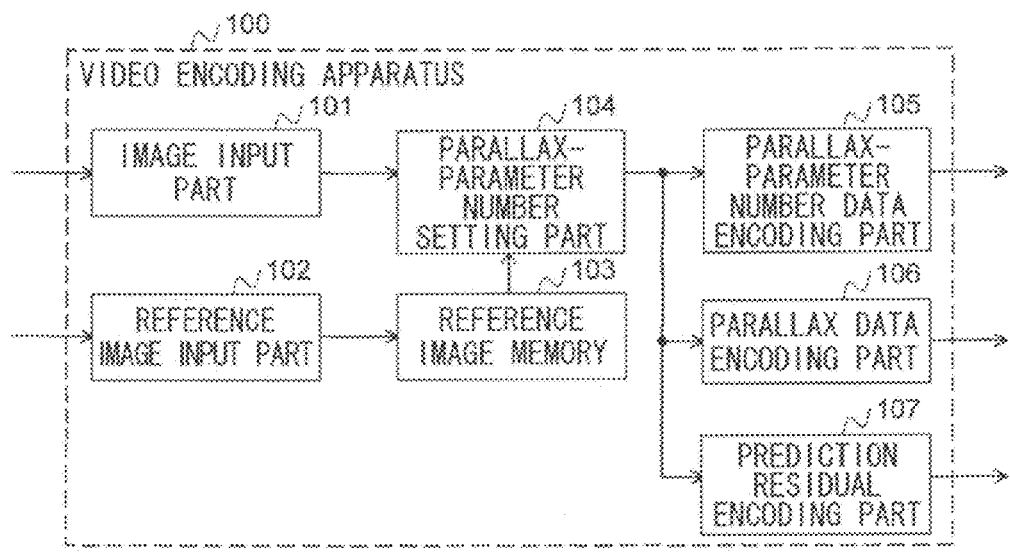
FIG. 1 is a diagram showing a video encoding apparatus as a first embodiment of the present invention.

A first embodiment will be explained. FIG. 1 is a diagram showing the structure of a video encoding apparatus of the first embodiment.

The video encoding apparatus 100 includes an image input part 101 into which each original image of camera C (i.e., target image to be encoded) is input; a reference image input part 102 into which decoded images (as reference images) of cameras A and B are input; a reference image memory 103 for storing each reference image; a parallax-parameter number setting part 104 for setting the number of parallax parameters for representing parallax data which is used for parallax compensation; a parallax-parameter number data encoding part 105 for encoding data of the number of parallax parameters; a parallax data encoding part 106 for encoding the parallax data; and a prediction residual encoding part 107 for encoding a prediction residual generated in the parallax compensation.

Figure 2:
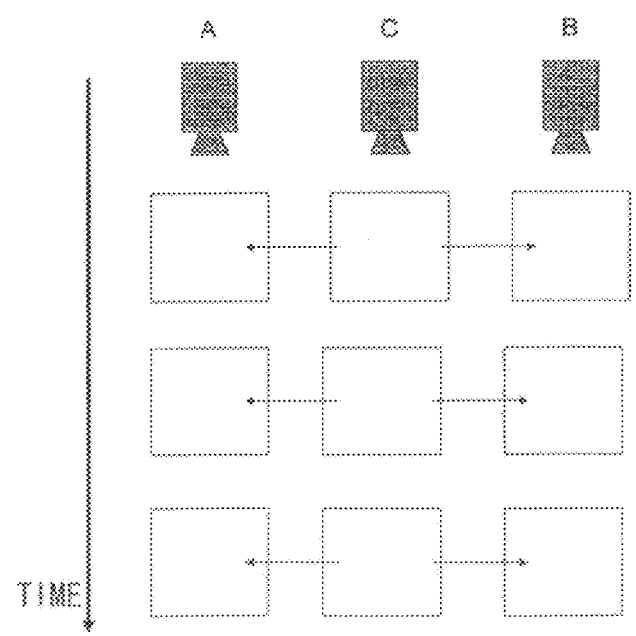
FIG. 2 is a diagram showing reference relationships between cameras in the first embodiment.

FIG. 2 is a diagram showing reference relationships between cameras in the first embodiment. As shown in FIG. 2, in the present embodiment for encoding multi-viewpoint video images obtained by three cameras, video images of camera C are encoded using decoded images of cameras A and B, as reference images.

The arrows in FIG. 2 represent reference relationships in parallax compensation. In order to encode each image of camera C, decoded images (of cameras A and B) having the same display time are encoded as reference images. In the relevant process, a predicted image is generated by computing an average between pixel values of the corresponding points belonging to the cameras A and B.

Figure 3:
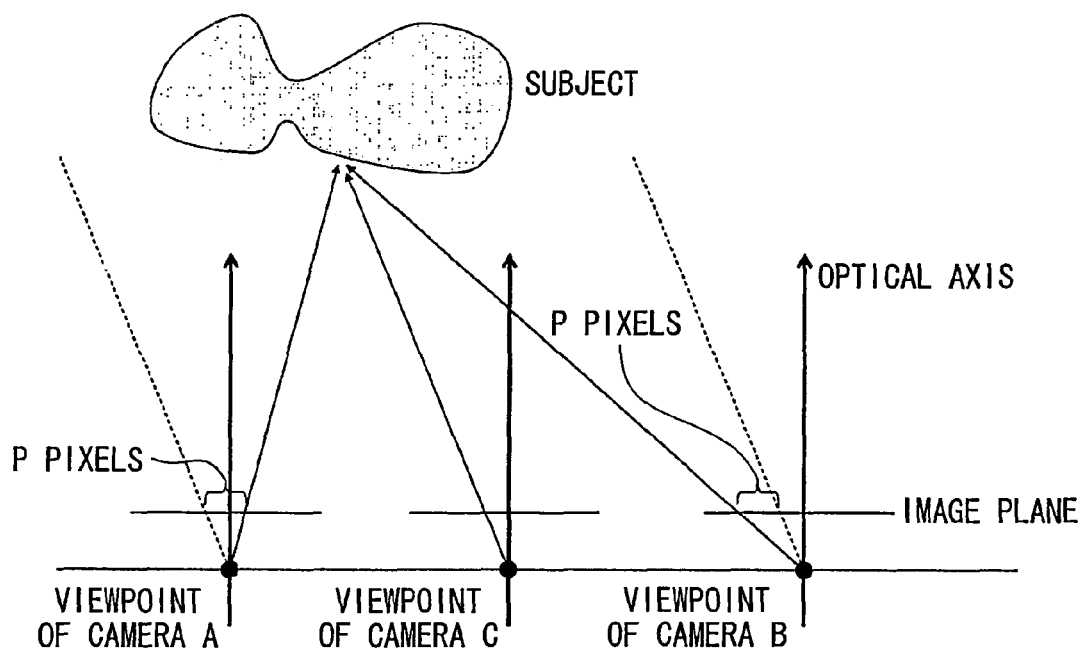
FIG. 3 is a diagram showing the arrangement of cameras in the first embodiment.

FIG. 3 is a diagram showing the arrangement of cameras in the first embodiment. In the present embodiment, the viewpoints of the three cameras align along a straight line at regular intervals, and the optical axes thereof are perpendicular to the straight line. That is, the optical axes of the three cameras are parallel to each other.

In addition, the x-y coordinate system on the relevant image plane can be obtained by parallel translation (no rotation or the like is performed) with respect to the straight line on which the cameras are arranged, and pixels are formed by dividing each of the x and y axes of the image plane at regular intervals for each camera. That is, each camera has the same resolution, and a parallax of P pixels between the cameras C and A corresponds to a parallax of P pixels between the cameras C and B.

Figure 4:
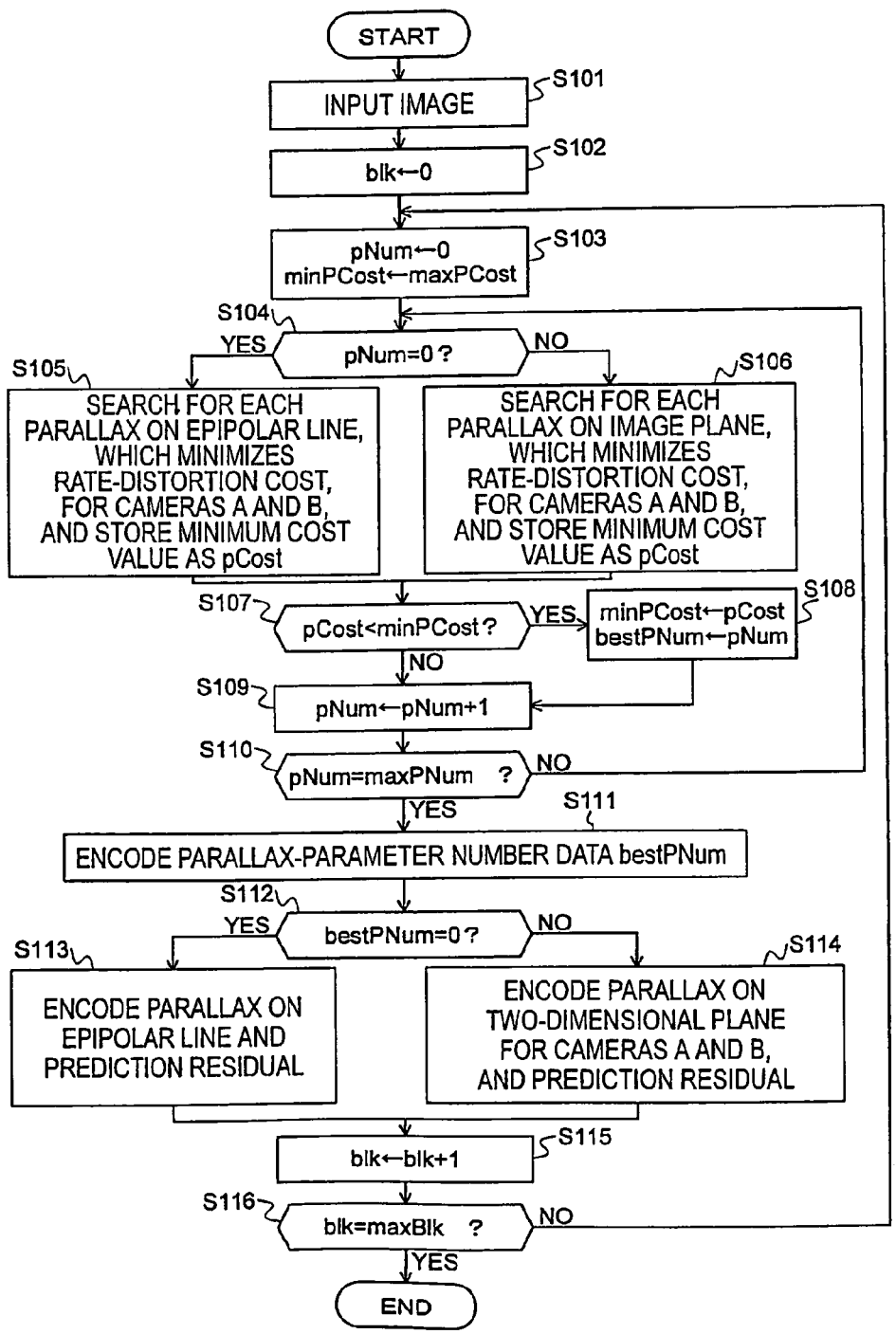
FIG. 4 is a flowchart of encoding in the first embodiment.

FIG. 4 is a flowchart of encoding in the first embodiment.

The flowchart shows processes performed when encoding an image obtained by the camera C, and vide image encoding is performed by repeating the processes for each image.

In the present embodiment, the method of representing the parallax data is adaptively switched in parallax compensation, between (i) the method of representing the parallax between reference images of cameras A and B by using parallax data which indicates the position on the Epipolar line for camera A by using a single parameter (i.e., the value of index "pNum" is 0), and (ii) the parallax for the reference image belonging to each of the cameras A and B is represented by a two-dimensional vector, and the relevant parallax data is represented by using four parameters (i.e., the value of index "pNum" is 1), where pNum is an index for indicating the data relating to the number of parallax parameters.

Such switching for the number of parallax parameters is performed for each block (as a unit) having N×N pixels both in X and Y axes, obtained by dividing each image into blocks. That is, for each N×N block, one (pNum=0) or four (pNum=1) parameters are encoded as parallax data.

Under the above conditions, the encoding operation will be explained in accordance with the flowchart of FIG. 4.

First, an image of camera C is input into the image input part 101 (see step S101), where decoded images, which belong to cameras A and B and have the same display time, have been stored into the reference image memory 103 via the reference image input part 102.

In the present flowchart, "blk" is an index which indicates each of N×N blocks obtained by dividing the relevant image, and "maxBlk" indicates the total number of blocks defined in each image.

After the index blk for each N×N block is initialized to zero (see step S102), the following steps (S103 to S116) are repeatedly applied to each N×N block while "1" is added to the index blk (see step S115), until the index blk reaches the total number maxBlk of blocks (see step S116).

First, in the parallax-parameter number setting part 104, data of a target block to be encoded (in image C), which corresponds to the index blk, is read, and reference images corresponding to cameras A and B are read from the reference image memory 103. Also in the parallax-parameter number setting part 104, a parallax search process is performed for each of the cases pNum=0 and pNum=1 (see steps S104 to S106).

The parallax search is performed in a manner such that a rate-distortion cost "cost" is minimized based on (i) the total sum "SAD" of the absolute values of prediction residuals in the relevant N×N block, which are obtained by parallax compensation, and (ii) an estimated value $R_{disp}$ of the amount of codes assigned to parallax data. Here, "cost" is calculated by the following formula:

$$\text{Cost} = SAD + \lambda R_{disp} \quad (1)$$

where λ is an undefined Lagrange multiplier, and is a predetermined value. In addition, in order to compute $R_{disp}$, the parallax data is subjected to variable-length encoding so as to compute the relevant amount of codes.

For each of the cases pNum=0 and pNum=1, the minimum value pCost of "cost" and parallax data for acquiring pCost are computed, and parallax data corresponding to the smaller pCost is determined to be used for encoding (see steps S107 to S110).

In the flowchart of FIG. 4, "minPcost" is a variable for storing the minimum value of pCost, and is set to "maxPCost" (i.e., so as to be initialized) which is an arbitrary value larger than the possible maximum value of pCost when the block "blk" is processed.

When pNum=0, the following process is performed in step 105.

That is, parallax search is performed in a predetermined range. In the camera arrangement of the present embodiment, when following the Epipolar geometry constraint, the parallax of camera A with respect to the pixel (x,y) of camera C is $(x+d_x, y)$ where $d_x \geq 0$, and the corresponding parallax of camera B is $(x-d_x, y)$. Here, in the coordinate system on the image plane having I×I pixels in the horizontal and vertical directions, the upper-left pixel is defined as (0,0), the upper-right pixel is defined as (I−1,0), the lower-left pixel is defined as (0, I−1). In the present embodiment, the range for the search is $d_x=0$ to P. Therefore, $SAD[d_x]$ is computed within the range of "$d_x=0$ to P" by the following formula:

$$SAD[d_x] = \sum_i \sum_j \text{ABS}(DEC_A[x+i+d_x, y+j]/2 + \quad (2)$$
$$DEC_B[x+i+d_x, y+j]/2 - IMG_c[x+i, y+j])$$

where $\Sigma_i$ is the relevant total sum when i=0 to N−1, and $\Sigma_j$ is the relevant total sum when j=0 to N−1. "ABS( )" indicates to compute the absolute value of the element in the parentheses. "$DEC_A[x,y]$" and "$DEC_B[x,y]$" respectively indicate brightness values of the pixel (x,y) in each decoded image of cameras A and B. "$IMG_c[x,y]$" indicates the brightness value of the pixel (x,y) in the original image of camera C. Here, (x,y) indicates the coordinates of the upper-left pixel in the relevant N×N block on the image plane.

In addition, the estimated value $R_{disp}[d_x]$ of the amount of code assigned to the parallax data (when the parallax is $d_x$) is computed, and the rate-distortion cost "cost[$d_x$]" for the parallax $d_x$ is computed using the above formula (I). The parallax which minimized cost[$d_x$] is defined as "bestDispPNum( )", and the corresponding cost is defined as "pCost".

Next, after "minPcost" is set to pCost, and "bestPnum" for storing the optimum pNum is set to 0, the operation is shifted to the process performed when pNum=1.

When pNum=1, the following process is performed in step 106.

That is, the Epipolar geometry constraint is not considered when pNum=1, and a two-dimensional parallax search is performed. More specifically, the respective ranges for search on the X axis for cameras A and B are defined as "$d_{x,A}$, $d_{x,B}$=−P to P" (i.e., the range "−P to P" for each of $d_{x,A}$ and $d_{x,B}$), and the respective ranges for search on the Y axis for cameras A and B are defined as "$d_{y,A}, d_{y,B}$=−P to P" (i.e., the range "−P to P" for each of $d_{y,A}$ and $d_{y,B}$). For every combination between ($d_{x,A}, d_{x,B}, d_{y,A}, d_{y,B}$), the following SAD[$d_{x,A}, d_{x,B}, d_{y,A}, d_{y,B}$] is computed:

$$SAD[d_{x,A}, d_{x,B}, d_{y,A}, d_{y,B}] = \sum_i \sum_j ABS(DEC_A[x+i+d_{x,A}, y+j+d_{y,A}]/2 + DEC_B[x+i+d_{x,B}, y+j+d_{y,B}]/2 - IMG_C[x+i, y+j]) \quad (3)$$

In addition, the estimated value $R_{disp}[d_{x,A}, d_{x,B}, d_{y,A}, d_{y,B}]$ of the amount of code assigned to the parallax data (when the parallax is ($d_{x,A}, d_{x,B}, d_{y,A}, d_{y,B}$)) is computed, and the rate-distortion cost "cost[$d_{x,A}, d_{x,B}, d_{y,A}, d_{y,B}$]" for the parallax is computed using the above formula (1). The parallax which minimized cost[$d_{x,A}, d_{x,B}, d_{y,A}, d_{y,B}$] is defined as "bestDispPNum1", and the corresponding cost is defined as "pCost".

If pCost<minPcost (see step S107), minPcost is set to pCost, and bestPNum, to which the optimum pNum is stored, is set to 1 (see step S108)

Next, in the parallax-parameter number data encoding part 105, bestPNum is subjected to variable-length encoding (see step S111). Additionally, in the parallax data encoding part 106, the parallax data is encoded. When bestPNum=0, data $d_x$ is subjected to variable-length encoding. When bestPNum=1, data "$d_{x,A}, d_{x,B}, d_{y,A}, d_{y,B}$" is subjected to variable-length encoding. Lastly, in the prediction residual encoding part 107, the prediction residual is encoded (see steps S112 to S114).

Figure 5:
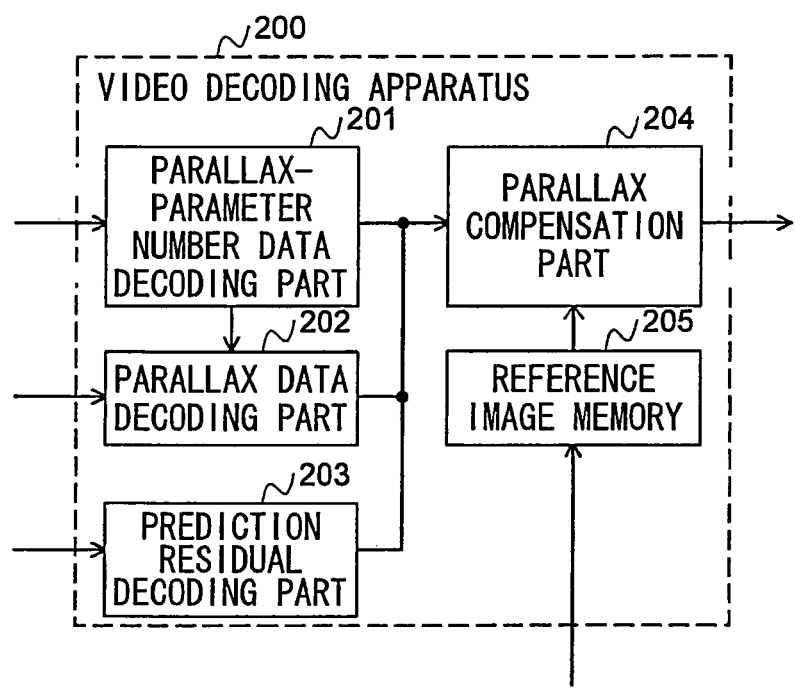
FIG. 5 is a diagram showing a video decoding apparatus in the first embodiment.

FIG. 5 shows a video decoding apparatus used in the first embodiment. The video decoding apparatus 200 includes a parallax-parameter number data decoding part 201 for decoding the data of the number of parallax parameters (i.e., parallax-parameter number data); a parallax data decoding part 202 for decoding the parallax data corresponding to the parallax-parameter number data; a prediction residual decoding part 203 for decoding the prediction residual; a parallax compensation part 204; and a reference image memory 205.

Figure 6:
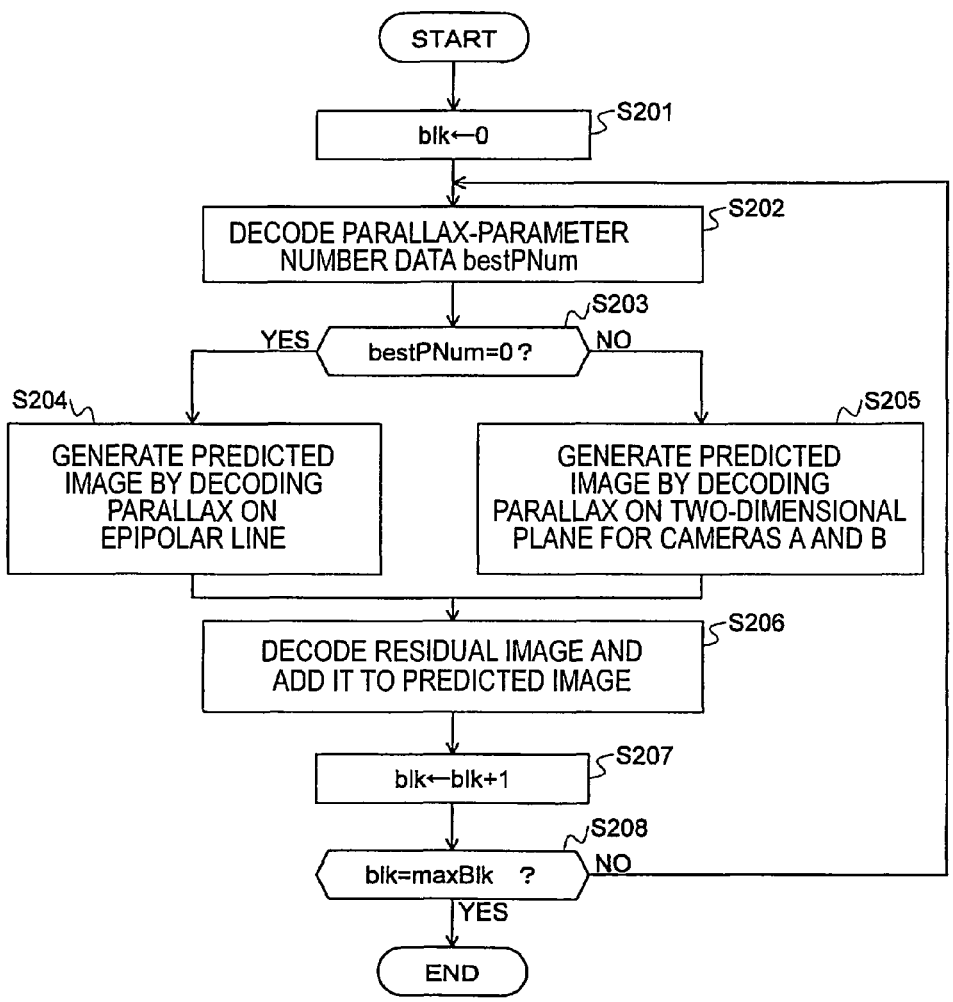
FIG. 6 is a flowchart of decoding in the first embodiment.

FIG. 6 is a flowchart of decoding of the present embodiment. This flowchart shows the operation for decoding one frame of camera C, and will be explained in detail below.

After the index "blk" for each N×N block is initialized to be "0" (see step S201), the following steps S202 to S208 are repeated for each N×N block in the relevant one frame (the number of blocks in one frame is "maxBlk"), the one frame of camera C is decoded. Here, the frames having the same time of cameras A and B have already been decoded, and the decoded images have been stored in the reference image memory 205.

First, the parallax-parameter number data decoding part 201 decodes the parallax-parameter number data "bestPNum" (see step S202). In accordance with the value of bestPNum (see step S203), the following process is performed.

When bestPNum=0, in the parallax data decoding part 202, parallax data $d_x$ is decoded. Then, into the parallax compensation part 204, the parallax-parameter number data bestPNum and the parallax data $d_x$ are input, and N×N blocks of cameras A and B, which correspond to the parallax data $d_x$, are also input from the reference image memory 205. When the position of each pixel in the target N×N block (for encoding) is indicated by (x,y) form, a predicted image PRED[x+i, y+j] is generated by the following formula (see step S204):

$$PRED[x+i, y+j]=DEC_A[x+i+d_x, y+j]/2+DEC_B[x+i+d_x, y+j]/2 \quad (4)$$

where i=0, 1, ..., N−1, and j=0, 1, ..., N−1.

When bestPNum=1, in the parallax data decoding part 202, parallax data ($d_{x,A}, d_{x,B}, d_{y,A}, d_{y,B}$) is decoded. Then, into the parallax compensation part 204, the parallax-parameter number data bestPNum and the parallax data ($d_{x,A}, d_{x,B}, d_{y,A}, d_{y,B}$) are input, and N×N blocks of cameras A and B, which correspond to the parallax data ($d_{x,A}, d_{x,B}, d_{y,A}, d_{y,B}$), are also input from the reference image memory 205. When the position of each pixel in the target N×N block (for encoding) is indicated by (x,y) form, a predicted image PRED[x+i, y+j] is generated by the following formula (see step S205):

$$PRED[x+i, y+j]=DEC_A[x+i+d_{x,A}, y+j+d_{y,A}]/2+DEC_B[x+i+d_{x,B}, y+j+d_{y,B}]/2 \quad (5)$$

where i=0, 1, ..., N−1, and j=0, 1, ..., N−1.

Next, in the prediction residual decoding part 203, into which the encoded prediction residual has been input, an N×N prediction residual block "RES[x+i, y+j]" is decoded. The prediction residual block is input into the parallax compensation part 204, and the sum of the prediction residual block and the predicted image is computed by the following formula, so as to obtain a decoded image $DEC_C$[x+i, y+j] (see step S206):

$$DEC_C[x+i, y+j]=RES[x+i, y+j]+PRED[x+i, y+j] \quad (6)$$

The above process is repeatedly performed while "1" is added to the index blk (see step S207), until the index blk reaches the number maxBlk of blocks in one frame, thereby obtaining a decoded image of camera C.

Second Embodiment

A second embodiment will be explained below.

Figure 7:
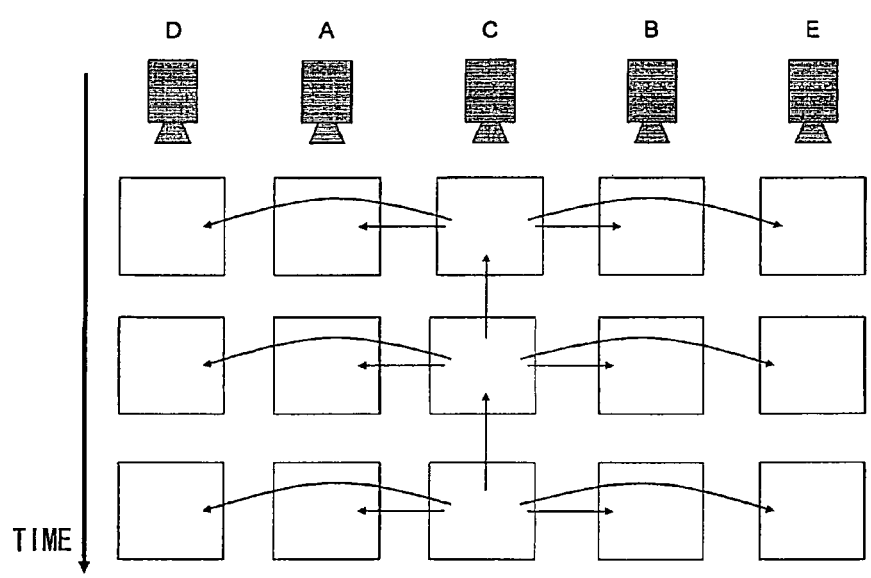
FIG. 7 is a diagram showing reference relationships between cameras in a second embodiment of the present invention.

In the present embodiment, as shown by reference relationships between cameras in FIG. 7, multi-viewpoint video images are encoded, wherein a video image of camera C is encoded by using decoded images of cameras A, B, D and E as reference images.

In the above-described first embodiment, each image of camera C is encoded by only using parallax compensation. However, in the present embodiment, encoding is performed by switchably executing one of motion compensation and parallax compensation for each block as a unit. The arrows in FIG. 7 indicate reference relationships when motion compensation or parallax compensation is performed.

In the parallax compensation, predicted images are generated by a plurality of pairs selected from cameras A, B, D, and E (here, three pairs of "A and B", "A and D", and "B and E"). The method of generating each predicted image is similar to the first embodiment, that is, the predicted image is generated using an average of the pixel values of corresponding points between the relevant two cameras.

Similar to the first embodiment, in the present embodiment, the viewpoints of the five cameras align on a straight line at regular intervals, and optical axes of the cameras are perpendicular to this straight line. That is, the five cameras have the relationships as shown in FIG. 3, and the optical axes thereof are parallel to each other.

Figure 8:
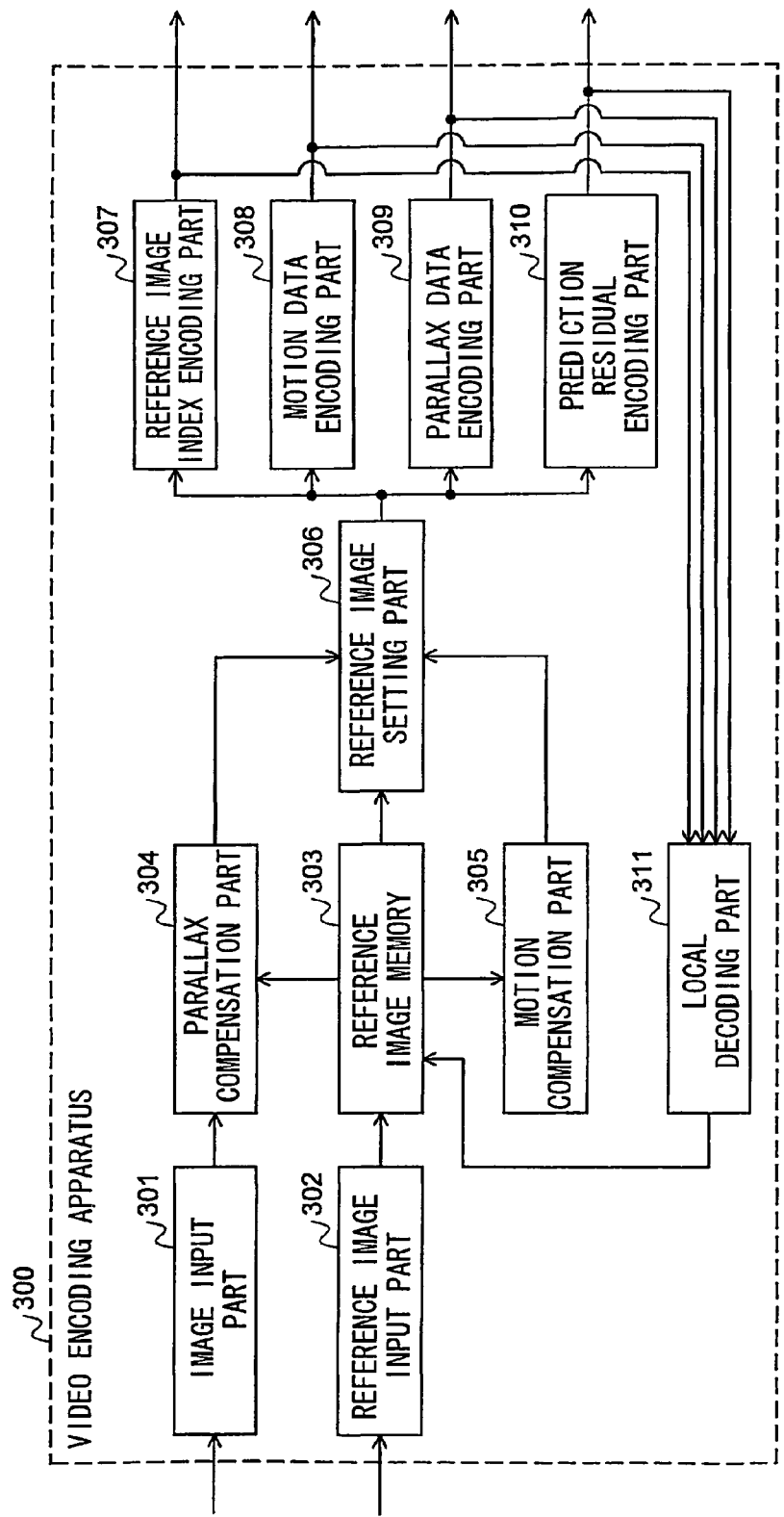
FIG. 8 is a diagram showing a video encoding apparatus in the second embodiment.

FIG. 8 is a diagram showing the structure of a video encoding apparatus of the second embodiment.

The video encoding apparatus 300 includes an image input part 301 into which each original image of camera C is input; reference image input part 302 into which decoded images of cameras A, B, D and F are input; a reference image memory 303 for storing each reference image; a parallax compensation part 304 for performing parallax compensation, a motion compensation part 305 for performing motion compensation, a reference image setting part 306, a reference image index encoding part 307, a motion data encoding part 308, a parallax data encoding part 309, a prediction residual encoding part 310, and a local decoding part 311.

Figure 9:
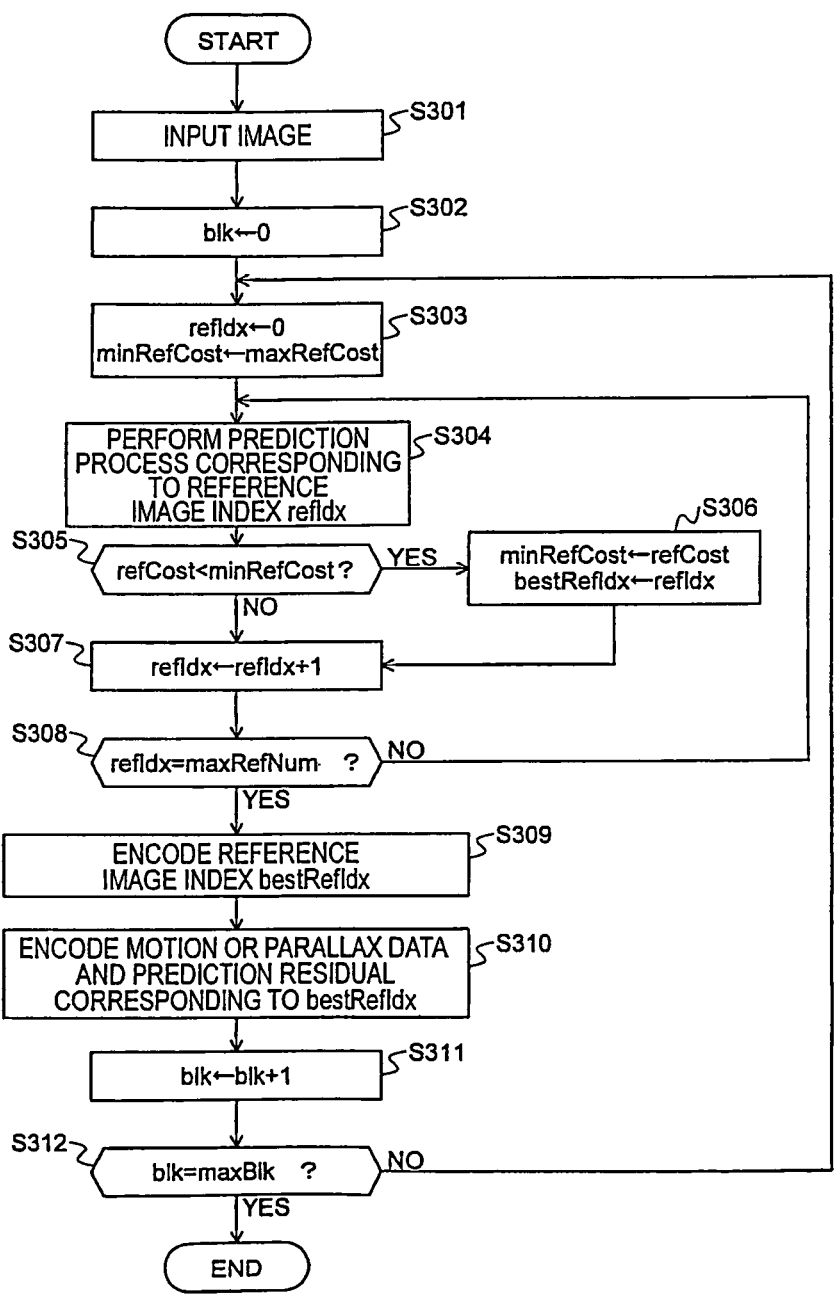
FIG. 9 is a flowchart of encoding in the second embodiment.
Figure 10:
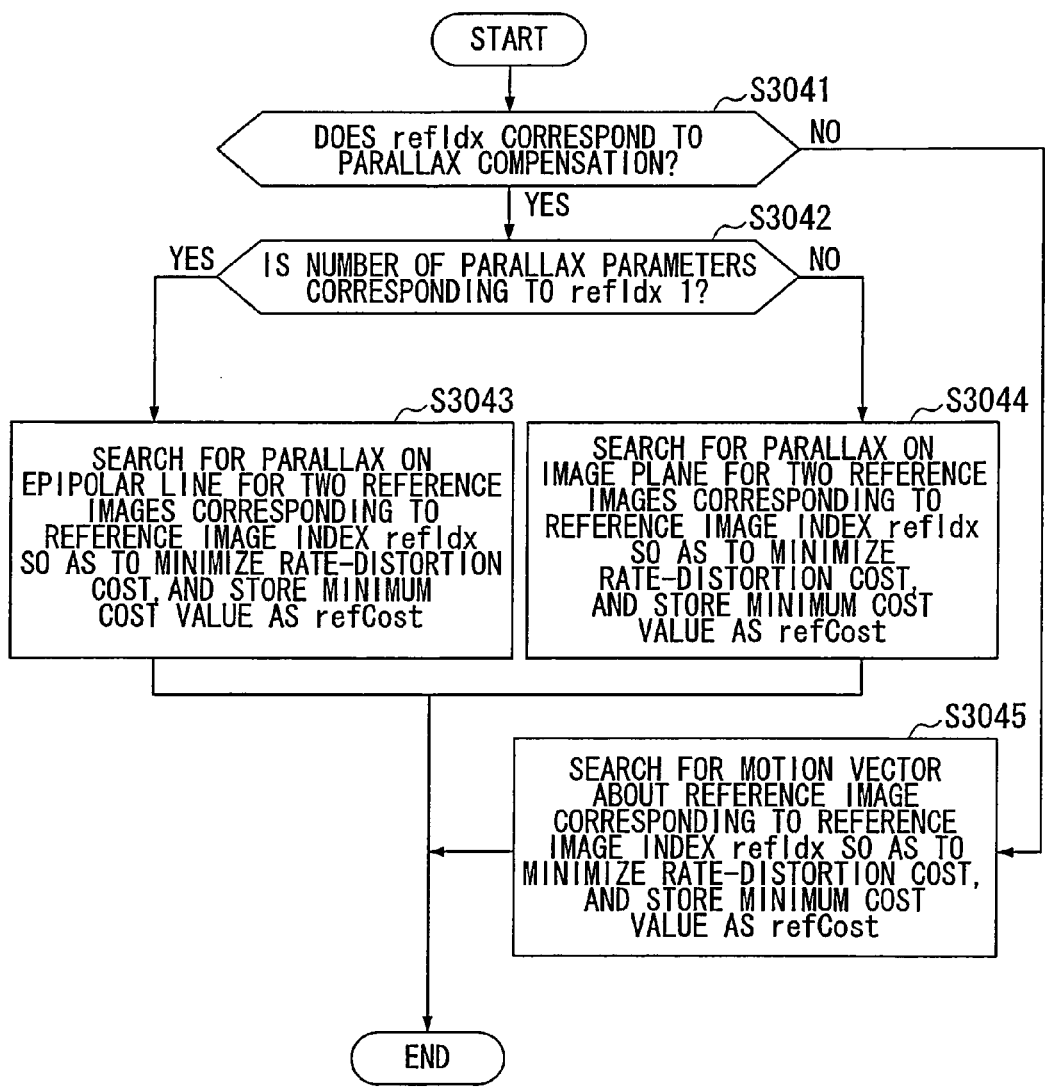
FIG. 10 is a detailed flowchart of step S304 in FIG. 9.

FIG. 9 is a flowchart of encoding performed in the present embodiment. FIG. 10 is a detailed flowchart of step S304 in FIG. 9.

The flowcharts show an operation performed when an image of camera C is encoded, and video encoding is performed by repeating the operation. In the present embodiment, encoding is performed by executing adaptive switching between the following processes:
(i) motion compensation using a past decoded image of camera C: refIdx=0, 1
(ii) parallax compensation using reference images of cameras A and B (pNum=0): refIdx=2
(iii) parallax compensation using reference images of cameras A and B (pNum=1): refIdx=3
(iv) parallax compensation using reference images of cameras A and D (pNum=0): refIdx=4
(v) parallax compensation using reference images of cameras A and D (pNum=1): refIdx=5
(vi) parallax compensation using reference images of cameras B and E (pNum=0): refIdx=6
(vii) parallax compensation using reference images of cameras B and E (pNum=1): refIdx=7
wherein "refIdx" is a reference image index.

With regard to "refIdx=0, 1", "refIdx=0" indicates a decoded image (of camera C) which is one-frame prior to the present frame, and "refIdx=1" indicates a decoded image (of camera C) which is two-frame prior to the present frame.

In the present embodiment, in encoding, the reference image index, which corresponds to the method and reference image used for each block, is encoded, and in decoding, pixel values of each block are decoded using the reference image index.

The above value assignment (i) to (vii) of the reference image index is used so as to encode image "C" on and after the third frame.

For the first frame, as there is no decoded image of camera C, no reference image index can be assigned to motion compensation, and a value smaller than the above assigned value by 2 is assigned to each case ((iii) to (Vii)) of parallax compensation (for example, for "parallax compensation using reference images of cameras A and B (pNum=0)", refIdx is set to 0 by the assignment of the reference image index value).

For the second frame, as only "refIdx=0" is effective for motion compensation, a value smaller than the above assigned value by 1 is assigned to each case ((iii) to (Vii)) of parallax compensation (for example, for "parallax compensation using reference images of cameras A and B (pNum=0)", refIdx is set to 1 by the assignment of the reference image index value).

Under the above-described conditions, the encoding operation will be explained with reference to the flowchart of FIG. 9, wherein the present operation is applied to camera C, on and after the third frame.

First, an image of the camera C is input into the image input part 301 (see step S301), where decoded images, which belong to the cameras A, B, D, and E, and have the same display time, have been stored into the reference image memory 303 via the reference image input part 302. In addition, decoded images of camera C, which are of one frame and two frames before the present frame and have been decoded by the local decoding part 311, have been input into the reference image memory 303.

In the present flowchart, "blk" is an index which indicates each of N×N blocks obtained by dividing the relevant image, and "maxBlk" indicates the total number of blocks defined in each image. After the index blk for each N×N block is initialized to zero (see step S302), the following steps (S303 to S312) are repeatedly applied to each N×N block while "1" is added to the index blk (see step S311), until the index blk reaches the total number maxBlk of blocks (see step S312).

First, the reference image index "refIdx" is initialized to have a value of "0", and a variable "minRefCost" for storing the minimum value of a cost value "refCost" is initialized to have an arbitrary value "maxRefCost", which is larger than the possible maximum value of resCost when processing the block "blk" (see step S303).

In each N×N block indicated by the index "blk", a prediction process corresponding to the relevant reference image index "refIdx" is performed (see step S304). In the prediction process, the cost value refCost corresponding to the relevant reference image index "refIdx" is computed, and the reference image index "refIdx" corresponding to the minimum refCost is used for encoding the present N×N block (see steps S305 and S306).

Below, the process corresponding to each reference image index "refIdx" in step S304 will be explained with reference to the flowchart of FIG. 10. In the following, motion compensation or parallax compensation is performed. In either case, motion or parallax data is obtained by minimizing "cost" which is computed by the following formula:

$$\text{cost} = SAD + \lambda R_{vec} \quad (7)$$

where $R_{vec}$ is an estimated value of the amount of codes assigned to the relevant motion or parallax data, and SAD is the total sum of the absolute values of prediction residuals.

When refIdx is 2 or greater, it corresponds to parallax compensation (see step S3041). Therefore, decoded images of two cameras corresponding to the refIdx are read as reference images by the parallax compensation part 304, so as to perform parallax compensation.

Also when refIdx is 2 or greater, it has the corresponding parameter number data pNum, which is 0 or 1. Accordingly, the parallax compensation process assigned to pNum=0 or pNum=1 is performed similar to the first embodiment.

That is, when the number of parallax parameters (i.e., pNum) is 1 (see step S3042), parallax on the relevant Epipolar line is searched for about two reference images corresponding to the reference image index "refIdx", so as to minimize the rate-distortion cost, and the minimum cost value is stored as "refCost" (see step S3043).

When the parameter number data (pNum) is not 1 (see step S3042), parallax on the relevant image plane is searched for about two reference images corresponding to the reference image index "refIdx", so as to minimize the rate-distortion cost, and the minimum cost value is stored as "refCost" (see step S3044).

In each of the above steps S3043 and S3044, refCost is finally determined by adding an estimated amount of codes for encoding of the reference image index "refIdx" to the computed minimum value (refCost) of the cost.

When refIdx is 0 or 1, it corresponds to motion compensation, and the operation proceeds to step S3045. In this case, a decoded image of camera C corresponding to the relevant refIdx is read as the reference image by the motion compensation part 305, so as to perform motion compensation. Specifically, the motion compensation is performed by minimizing "cost", which is computed by the formula (7). In this case, refCost is determined by adding an estimated amount of codes for the encoding of the reference image index "refIdx" to the computed minimum value of "cost" (see step S3045).

If the computed refCost is smaller than "minRefCost" for storing the present minimum value (see step S305), minRefCost is set to refCost, and the corresponding refIdx is stored as "bestRefIdx" (see step S306). The above process is repeated while "1" is added to refIdx, until refIdx reaches "maxRefNum" which is the total number of index values (see steps S307 and S308).

After the above-described operation is applied to each reference image, the reference image index which minimized refCost (i.e., bestRefIdx) is obtained by the reference image setting part 306, so that the reference image index used for encoding is determined.

Next, bestRefIdx is encoded by the reference image index encoding part 307 (see step S309), the relevant motion or parallax data is encoded by the motion data encoding part 308 or the parallax data encoding part 309, and the prediction residual is encoded by the prediction residual encoding part 310 (see step S310).

Then, I is added to the index "blk" (see step S311), and the above operation is repeated until "blk" reaches the total number maxBlk of blocks (see step S312), thereby encoding one frame of camera C.

Figure 11:
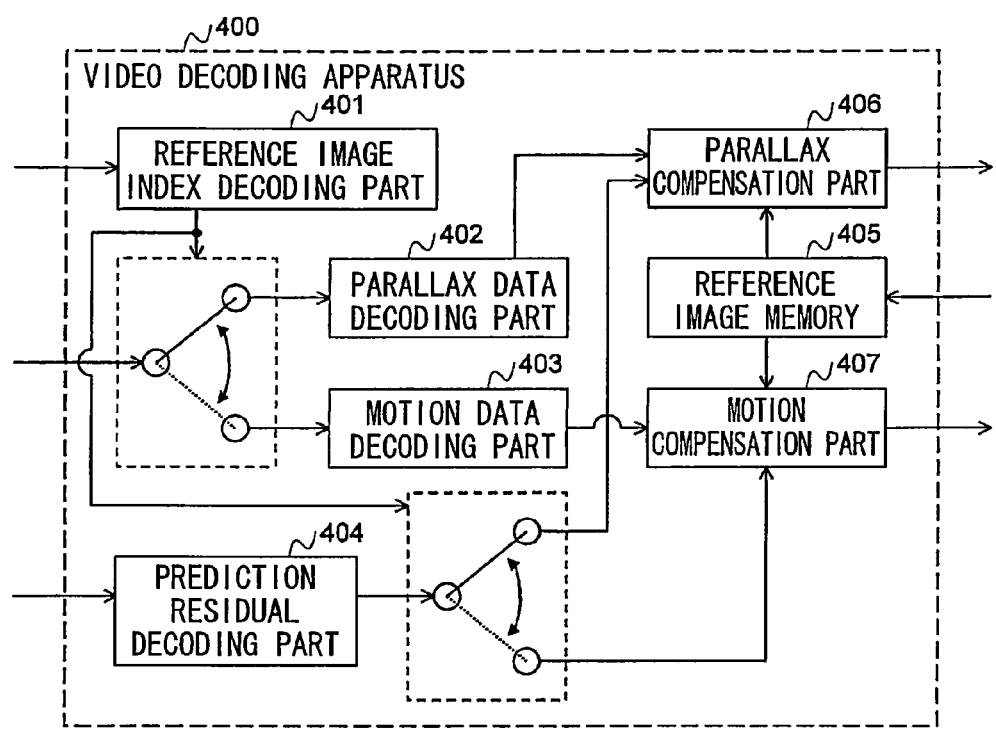
FIG. 11 is a diagram showing a video decoding apparatus in the second embodiment.

FIG. 11 shows a video decoding apparatus used in the second embodiment. The video decoding apparatus 400 includes a reference image index decoding part 401 for decoding the reference image index; a parallax data decoding part 402 for decoding the parallax data; a motion data decoding part 403 for decoding the motion data; a prediction residual decoding part 404 for decoding the prediction residual; a reference image memory 405 for storing each reference image; a parallax compensation part 406 for performing parallax compensation; and a motion compensation part 407 for performing motion compensation.

Figure 12:
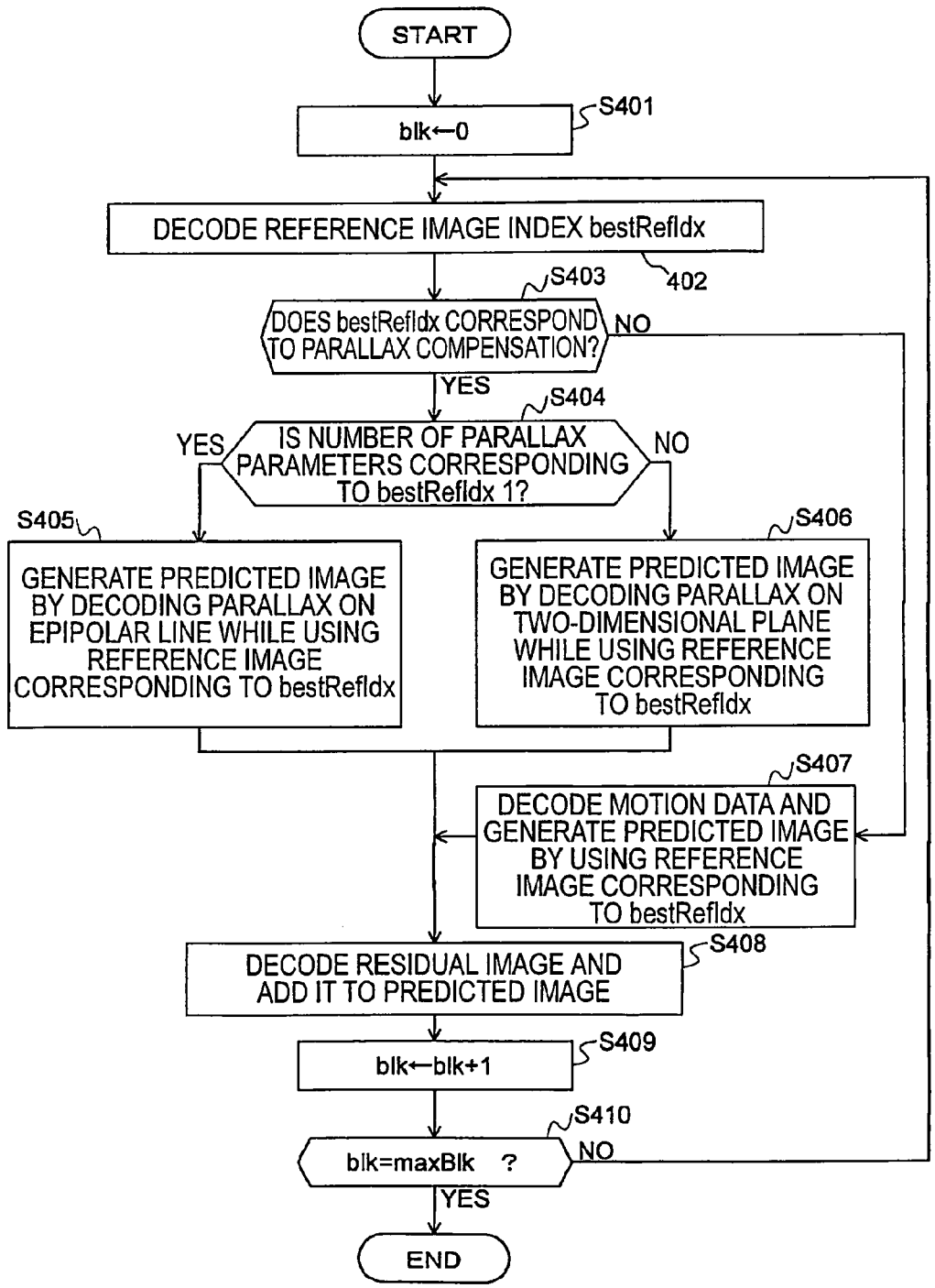
FIG. 12 is a flowchart of decoding in the second embodiment.
Figure 13:
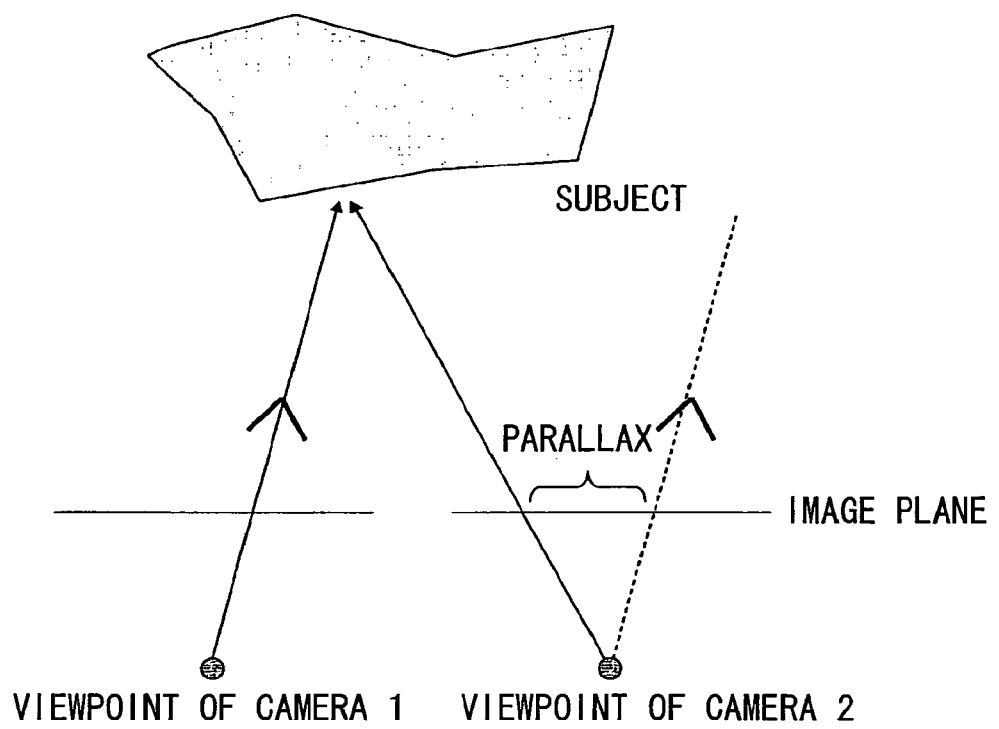
FIG. 13 is a schematic view showing the concept of parallax generated between cameras.
Figure 14:
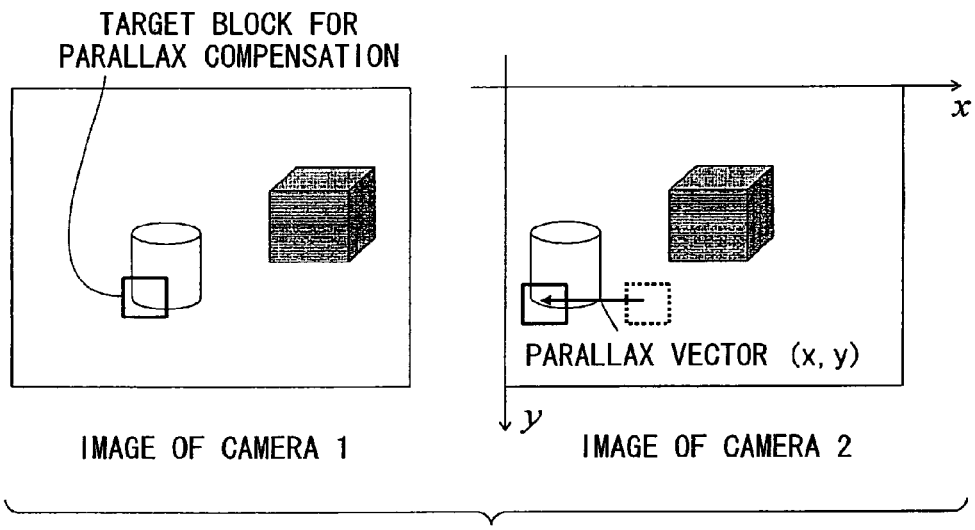
FIG. 14 is a schematic view showing a parallax vector.
Figure 15:
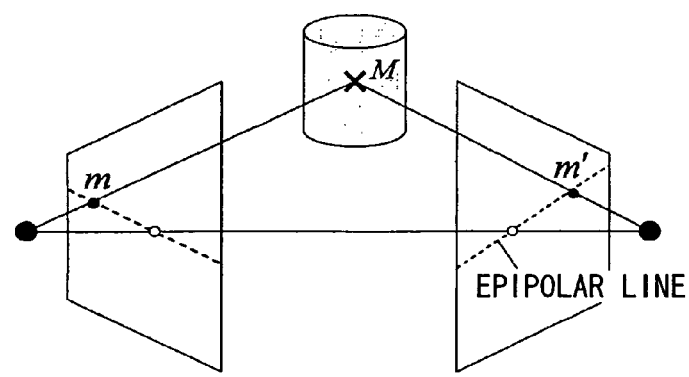
FIG. 15 is a schematic view showing the concept of the Epipolar geometry constraint.
Figure 16:
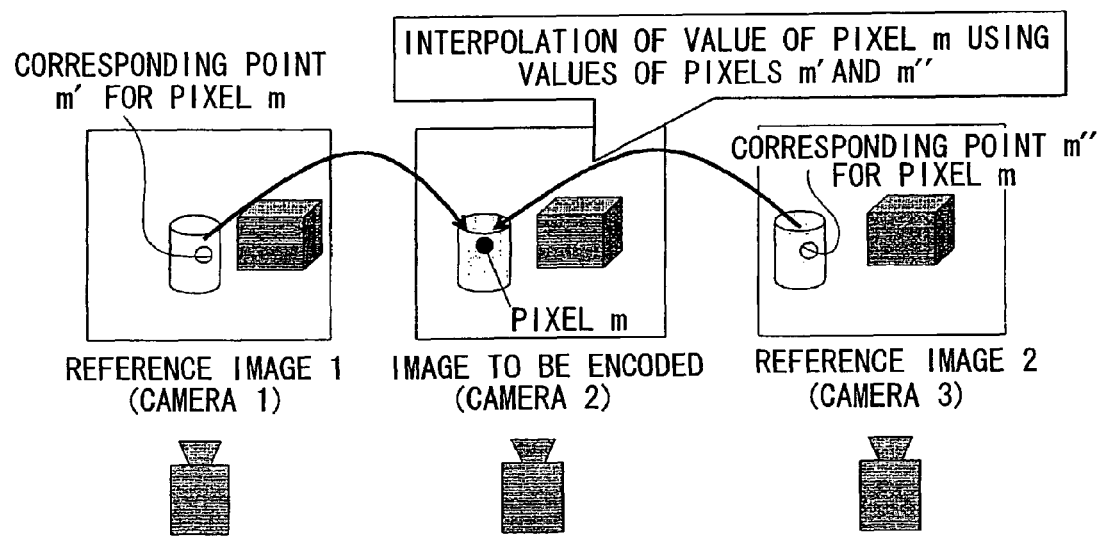
FIG. 16 is a schematic view showing pixel-value interpolation.

FIG. 12 is a flowchart of decoding of the present embodiment. This flowchart shows the operation for decoding one frame of camera C, and will be explained in detail below.

After the index blk for each N×N block is initialized to "0" (see step S401), the following steps S402 to S410 are repeated for each N×N block while "1" is added to the index "blk" (see step S409), until blk reaches the total number maxBlk of blocks (see step S410). Accordingly, one frame of camera C is decoded. Here, (i) decoded images of the frames having the same time of cameras A, B, E and D, and (ii) decoded images of past frames, which are respectively one frame and two frames before the present frame, of camera C, have already been stored in the reference image memory 405.

First, the reference image index decoding part 401 decodes the reference image index "bestRefIdx" (see step S402). In accordance with the value of bestRefIdx (see steps S403 and S404), the following process is performed.

When bestRefIdx=0 or 1, it is a reference image index corresponding to motion compensation, and the motion data is decoded by the motion data decoding part 403. Then the reference image corresponding to bestRefIdx (0 or 1) is read by the motion compensation part 407, so as to generate a predicted image (see step S407).

The prediction residual decoding part 404 decodes the prediction residual, and the motion compensation part 407 adds the predicted image to the prediction residual (see step S408), thereby generating the decoded image of the relevant N×N block.

When bestRefIdx is 2 or greater, it is a reference image index corresponding to parallax compensation, and the reference images belonging to two cameras, which correspond to the reference image index bestRefIdx, are read, and decoding is performed by means of parallax compensation.

In this case, as the value of the parallax-parameter number data pNum is assigned to the reference image index bestRefIdx, the process corresponding to pNum is performed. The process of parallax compensation is similar to the first embodiment (see steps S404 to S406). The prediction residual decoding part 404 decodes the prediction residual, and the motion compensation part 407 adds the predicted image to the prediction residual (see step S408), thereby generating the decoded image of the relevant N×N block.

Then "1" is added to the index "blk" (see step S409), and the above operation is repeated until blk reaches the total number maxBlk of blocks (see step S410), thereby decoding one frame of camera C.

The above-described correspondence between the reference image index and "data for indicating which of motion compensation and parallax compensation is used, the reference image, and the parallax-parameter number data" is just an example, and such correspondence is a design matter which can be arbitrarily determined when the present invention is implemented.

The above-described video encoding and decoding processes can be implemented by using a computer and a software program. Such a program may be provided by storing it into a computer-readable storage medium, or through a network.

INDUSTRIAL APPLICABILITY

In parallax compensation used for encoding multi-viewpoint video images, (i) if the prediction efficiency is degraded when the prediction is performed in accordance with the Epipolar geometry constraint, due to a measurement error in camera parameters or an encoding distortion in each reference image, then the number of parameters for parallax data is increased so as to perform a prediction having a high degree of freedom, and (ii) if the prediction efficiency is sufficient even when the prediction is performed in accordance with the Epipolar geometry constraint, then a prediction which represents parallax by using one parameter is performed. Such a selection can be adaptively controlled in accordance with the characteristic of each frame or block (as a unit) in the relevant decoded image. Therefore, a higher encoding efficiency can be obtained in comparison with the conventional techniques.

The invention claimed is:

1. A video encoding method for encoding video images as a single video image by using parallax compensation which performs prediction by using parallax between the video images, the method comprising:

a parallax-parameter number setting step of selecting and setting a parameter number which indicates the number of parameters corresponding to the dimension of a parallax vector as parallax data used for the parallax compensation of the video images to be encoded using reference images;

a parallax-parameter number data encoding step of encoding data of the parameter number set in the parallax-parameter number setting step; and a parallax data encoding step of encoding the parallax data corresponding to the number of parameters, wherein:

values of the parameter number settable in the parallax-parameter number setting step include:

a first parameter number which indicates a mode in which each parallax for a reference image assigned to each camera by which the reference image is obtained is generated using predetermined common parallax data between the reference images; and a second parameter number which indicates a mode in which each parallax for a reference image assigned to each camera by which the reference image is obtained is set using individual parallax data assigned to the camera;

when the first parameter number is selected, a predicted image is generated based on the parallax for the reference image assigned to each camera, the parallax being generated using the common parallax data, and on pixel values of the relevant reference images, and in the parallax data encoding step, only the common parallax data is encoded; and when the second parameter number is selected, a predicted image is generated based on the individual parallax data for indicating each parallax for the corresponding reference image and on pixel values of the relevant reference images, and in the parallax data encoding step, the individual parallax data for indicating each parallax is encoded, wherein the common parallax data, used when the first parameter number is selected, is parallax data with respect to a predetermined camera, wherein the individual parallax data, used when the second parameter number is selected, includes data using a two-dimensional vector $(d_x, d_y)$ where $d_x$, $d_y$ is within the range of $-P$ to $+P$ where P is the parallax of pixels between the cameras, and wherein the predetermined common parallax data is a one-dimensional parallax vector $d_x$, where $d_x$ is within the range of 0 to P, and which indicates the position on the Epipolar line for the predetermined camera by using a single parameter.

2. The video encoding method in accordance with claim 1, further comprising:

a reference image setting step of selecting and determining each reference image used in the parallax compensation; and a reference image index encoding step of
selecting one of a plurality of reference image indexes, to each of which the reference image used in the parallax compensation is assigned in advance, wherein the selected reference image index corresponds to the reference image determined in the reference image setting step, and
encoding the selected reference image index.

3. A video decoding method for decoding video images as a single video image by using parallax compensation which performs prediction by using parallax between the video images, the method comprising:

a parallax-parameter number data decoding step of decoding data of a parameter number which is included in encoded data and indicates the number of parameters corresponding to the dimension of a parallax vector as parallax data used for the parallax compensation of the video images to be decoded using reference images;

a parallax data decoding step of decoding parallax data which is included in the encoded data and corresponds to the number of parameters; and a parallax compensation step of performing the parallax compensation by using the decoded parallax data, wherein:

possible values of the parameter number include:
a first parameter number which indicates a mode in which each parallax for a reference image assigned to each camera by which the reference image is obtained is generated using predetermined common parallax data between the reference images; and a second parameter number which indicates a mode in which each parallax for a reference image assigned to each camera by which the reference image is obtained is set using individual parallax data assigned to the camera;

when the parameter number has a value of the first parameter number, then in the parallax data decoding step, only the common parallax data is decoded, and a predicted image is generated based on the parallax for the reference image assigned to each camera, the parallax being generated using the common parallax data, and on pixel values of the relevant reference images; and when the parameter number has a value of the second parameter number, then in the parallax data decoding step, the individual parallax data for indicating each parallax for the corresponding reference image is decoded, and a predicted image is generated based on the decoded parallax data and on pixel values of the relevant reference images, wherein the common parallax data, used when the first parameter number is selected, is parallax data with respect to a predetermined camera, wherein the individual parallax data, used when the second parameter number is selected, includes data using a two-dimensional vector $(d_x, d_y)$ where $d_x$, $d_y$ is within the range of $-P$ to $+P$ where P is the parallax of pixels between the cameras, and wherein the predetermined common parallax data is a one-dimensional parallax vector $d_x$, where $d_x$ is within the range of 0 to P, and which indicates the position on the Epipolar line for the predetermined camera by using a single parameter.

4. The video decoding method in accordance with claim 3, further comprising:

a reference image index decoding step of decoding a reference image index included in the encoded data, wherein the reference image index is one of reference image indexes, to each of which the reference image used in the parallax compensation is assigned in advance, wherein in the parallax compensation step, the parallax compensation is performed by using the reference image indicated by the decoded reference image index.

5. A video encoding apparatus for encoding video images as a single video image by using parallax compensation which performs prediction by using parallax between the video images, the apparatus comprising:

a parallax-parameter number setting device for selecting and setting a parameter number which indicates the number of parameters corresponding to the dimension of a parallax vector as parallax data used for the parallax compensation of the video images to be encoded using reference images;

a parallax-parameter number data encoding device for encoding data of the parameter number set by the parallax-parameter number setting device; and a parallax data encoding device for encoding the parallax data corresponding to the number of parameters, wherein:

values of the parameter number settable by the parallax-parameter number setting device include:
a first parameter number which indicates a mode in which each parallax for a reference image assigned to each camera by which the reference image is obtained is generated using predetermined common parallax data between the reference images; and a second parameter number which indicates a mode in which each parallax for a reference image assigned to each camera by which the reference image is obtained is set using individual parallax data assigned to the camera;

when the first parameter number is selected, a predicted image is generated based on the parallax for the reference image assigned to each camera, the parallax being generated using the common parallax data, and on pixel values of the relevant reference images, and the parallax data encoding device encodes only the common parallax data; and when the second parameter number is selected, a predicted image is generated based on the individual parallax data for indicating each parallax for the corresponding reference image and on pixel values of the relevant reference images, and the parallax data encoding device encodes the individual parallax data for indicating each parallax, wherein the common parallax data, used when the first parameter number is selected, is parallax data with respect to a predetermined camera, wherein the individual parallax data, used when the second parameter number is selected, includes data using a two-dimensional vector $(d_x, d_y)$ where $d_x, d_y$ is within the range of $-P$ to $+P$ where P is the parallax of pixels between the cameras, and wherein the predetermined common parallax data is a one-dimensional parallax vector $d_x$, where $d_x$ is within the range of 0 to P, and which indicates the position on the Epipolar line for the predetermined camera by using a single parameter.

6. A video decoding apparatus for decoding video images as a single video image by using parallax compensation which performs prediction by using parallax between the video images, the apparatus comprising:

a parallax-parameter number data decoding device for decoding data of a parameter number which is included in encoded data and indicates the number of parameters corresponding to the dimension of a parallax vector as parallax data used for the parallax compensation of the video images to be decoded using reference images;

a parallax data decoding device for decoding parallax data which is included in the encoded data and corresponds to the number of parameters; and a parallax compensation device for performing the parallax compensation by using the decoded parallax data, wherein:

possible values of the parameter number include:

a first parameter number which indicates a mode in which each parallax for a reference image assigned to each camera by which the reference image is obtained is generated using predetermined common parallax data between the reference images; and a second parameter number which indicates a mode in which each parallax for a reference image assigned to each camera by which the reference image is obtained is set using individual parallax data assigned to the camera;

when the parameter number has a value of the first parameter number, then the parallax data decoding device decodes only the common parallax data, and a predicted image is generated based on the parallax for the reference image assigned to each camera, the parallax being generated using the common parallax data, and on pixel values of the relevant reference images; and when the parameter number has a value of the second parameter number, then the parallax data decoding device decodes the individual parallax data for indicating each parallax for the corresponding reference image, and a predicted image is generated based on the decoded parallax data and on pixel values of the relevant reference images, wherein the common parallax data, used when the first parameter number is selected, is parallax data with respect to a predetermined camera, wherein the individual parallax data, used when the second parameter number is selected, includes data using a two-dimensional vector $(d_x, d_y)$ where $d_x, d_y$ is within the range of $-P$ to $+P$ where P is the parallax of pixels between the cameras, and wherein the predetermined common parallax data is a one-dimensional parallax vector $d_x$, where $d_x$ is within the range of 0 to P, and which indicates the position on the Epipolar line for the predetermined camera by using a single parameter.

7. A non-transitory computer-readable storage medium which stores a video encoding program for making a computer execute the video encoding method in accordance with claim 1.

8. A non-transitory computer-readable storage medium which stores a video decoding program for making a computer execute the video decoding method in accordance with claim 3.

* * * * *